United States Patent
Roesler et al.

(10) Patent No.: US 6,884,503 B2
(45) Date of Patent: *Apr. 26, 2005

(54) RECORDING NOISE REDUCTION

(75) Inventors: Alexander Roesler, Rochelle, TX (US); Yung Yip, Afton, MN (US)

(73) Assignee: Imation Corp., Oakdale, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/860,686

(22) Filed: Jun. 3, 2004

(65) Prior Publication Data

US 2004/0224186 A1 Nov. 11, 2004

Related U.S. Application Data

(63) Continuation of application No. 10/003,219, filed on Oct. 30, 2001, now Pat. No. 6,753,078.

(51) Int. Cl.$^7$ ................................................. B32B 5/16
(52) U.S. Cl. .............. 428/336; 428/694 R; 428/694 TS
(58) Field of Search ............................ 428/336, 694 R, 428/694 TS, 800

(56) References Cited

U.S. PATENT DOCUMENTS

| | | |
|---|---|---|
| 4,374,403 A | 2/1983 | Oshima et al. |
| 4,649,449 A | 3/1987 | Sawada et al. |
| 5,576,085 A | 11/1996 | Lal et al. |
| 5,645,917 A | 7/1997 | Ejiri et al. |
| 5,705,268 A | 1/1998 | Ishikawa et al. |
| 5,815,342 A | 9/1998 | Akiyama et al. |
| 6,753,078 B2 * | 6/2004 | Roesler et al. .............. 428/336 |

OTHER PUBLICATIONS

Veitch et al., "Improved Overwrite Performance of Dual Magnetic Layer Tape Coatings," IEEE Transactions on Magnetics, vol. 35, No. 5, pp. 2787–2789 (Sep. 1999).

R.J. Veitch, "Mimicking Very Thin Particulate Coatings by Employing a Soft-Magnetic Underlayer," IEEE Transactions of Magnetics, vol. 36, No. 5, pp. 2429–2431 (Sep. 2000).

Roesler et al., "Experimental Analysis of Tape Noise," IEEE Transactions on Magnetics, vol. 37, No. 4, pp. 1627–1629 (Jul. 2001).

* cited by examiner

*Primary Examiner*—Leszek Kiliman
(74) *Attorney, Agent, or Firm*—Eric D. Levinson

(57) ABSTRACT

A magnetic recording medium includes a highly permeable magnetic layer proximal to a recording layer. During recording, the permeable magnetic layer modifies the recording field from a recording head to produce consistently shaped recording transitions with a significant perpendicular component. The transitions are consistently shaped even though the distance between the recording head and the surface of the medium may change. Transitions so formed result in a reduction of noise from the medium surface roughness. The permeable magnetic layer further reduces noise caused by stray dipole fields.

10 Claims, 3 Drawing Sheets

RECORDING NOISE REDUCTION

This application is a continuation and claims the benefit of U.S. Ser. No. 10/003,219 filed Oct. 30, 2001, published as U.S. Patent Application Publication No. 2003/0082411 now U.S. Pat. No. 6,753,078.

TECHNICAL FIELD

The invention relates to recording and, more particularly, techniques for recording noise reduction.

BACKGROUND

Magnetic recording media, which include magnetic tape and magnetic disks, are used for storage and retrieval of data. The data are encoded in magnetizations on the recording surface. In particular, the data are encoded in transitions, which represent boundaries between regions of magnetization reversal.

There are two parts to a magnetic recording system. The first part is the magnetic recording medium, which holds the data. A typical magnetic recording medium consists of a thin layer of ferromagnetic material, such as gamma ferric oxide, supported by a non-magnetic substrate. The ferromagnetic material is a material that can be permanently magnetized upon application of an external magnetic field. The ferromagnetic material normally includes magnetic particles mixed with a binder to attach it to the non-magnetic substrate.

The second part to a magnetic recording system is the recording head, which applies the external magnetic field that magnetizes the magnetic recording medium. The recording head is an electromagnet that typically comprises ferromagnetic C-shaped core wrapped with a wire coil. The core includes a very narrow gap that is positioned near the magnetic recording medium.

The recording head is energized when current flows through the coil. Current in the coil induces a magnetic flux in the core and causes a fringing magnetic field, also called the recording field, to be generated across the gap. The recording field, which normally has an arcuate or substantially circular profile, extends from the gap through the magnetic recording medium. The recording field gradient is sharper near the gap and broader further from the gap. When the recording field passes through the magnetic recording medium, a remnant magnetization is created on the ferromagnetic surface. This results in a permanent magnetization of the ferromagnetic surface.

When any data stored magnetically are recovered from a magnetic recording medium, there is a risk that the data are contaminated with noise. Generally speaking, noise represents undesirable, unpredictable and random signals. In creating a magnetic recording system, it is desirable to identify sources of noise and, if possible, to reduce or eliminate them.

SUMMARY

In general, the invention allows for noise reduction in the magnetic recording medium. More specifically, the present invention allows for the reduction of what herein will be referred to as "tone noise," relating to recording of transitions. Tone noise is caused by at least two sources: position jitter and transition width broadening. Stray magnetic dipole fields from the roughness of layer interfaces are an additional source of medium noise. Each of these sources contributes to undesirable noise on the magnetic recording medium.

The invention reduces noise by including a highly permeable particulate soft magnetic underlayer proximal to the recording layer. The permeable layer modifies the recording magnetic fields extending from the recording head gap by shunting the field into the permeable underlayer. In effect, the permeable magnetic underlayer shapes the recording field, and thereby shapes the recorded transitions.

The permeable magnetic underlayer causes the formation of an image recording field of opposite polarity to the real recording field. The image field behaves as though the field were generated by an image recording head. When the recording layer is thin, the magnetic field behaves as though one pole of the real recording head is closer to the opposite pole of the image recording head than to the opposite pole of the real recording head. As a result, the recording field from one pole of the recording head is drawn to opposite pole of the image recording head, rather than to the opposite pole of the real recording head.

As a consequence of the image in the permeable magnetic underlayer, the recording field penetrating the recording layer has a substantial perpendicular component, and a greatly reduced horizontal component. Moreover, the shape of the recording field has reduced sensitivity to changes in the distance between the recording head and the surface of the medium.

In this way, the recording field records magnetic transitions that are consistently shaped. These characteristics of the transitions reduce position jitter and transition width broadening, and thereby reduce tone noise. In addition, the permeable magnetic underlayer reduces the noise effects of stray magnetic dipole fields. In these ways, a magnetic recording medium with a permeable magnetic underlayer records data with less noise, and therefore has an improved signal-to-noise ratio.

In one embodiment, the invention presents an apparatus comprising a magnetic recording head having a gap and a magnetic recording medium. The magnetic recording medium has a recording layer and a permeable magnetic underlayer proximal to the recording layer. The thickness of the recording layer is less than or equal to one-half the width of the gap.

In another embodiment, the invention presents a magnetic recording medium comprising a recording layer, a substrate and a permeable magnetic underlayer between the recording layer and the substrate. The permeable magnetic underlayer alters a recording field passing through the recording layer. The permeable magnetic underlayer alters the a recording field, for example, by increasing a perpendicular component of the recording field.

In a further embodiment, the invention presents a magnetic recording medium. The medium comprises a recording layer, a permeable magnetic underlayer adjacent the magnetic recording layer and a substrate. The thickness of the recording layer is selected as a function of the width of a gap on a recording head. The invention further presents a method for making such a medium.

In an additional embodiment, the invention presents a method comprising passing a recording field through a recording layer of a magnetic recording medium and regulating the shape of the recording field with a permeable magnetic underlayer. The method may further include regulating a perpendicular component of the recording field with the permeable magnetic underlayer.

Additional details of various embodiments are set forth in the accompanying drawings and the description below. Other features, objects and advantages will become apparent from the description and drawings, and from the claims.

DETAILED DESCRIPTION

Figure 1:
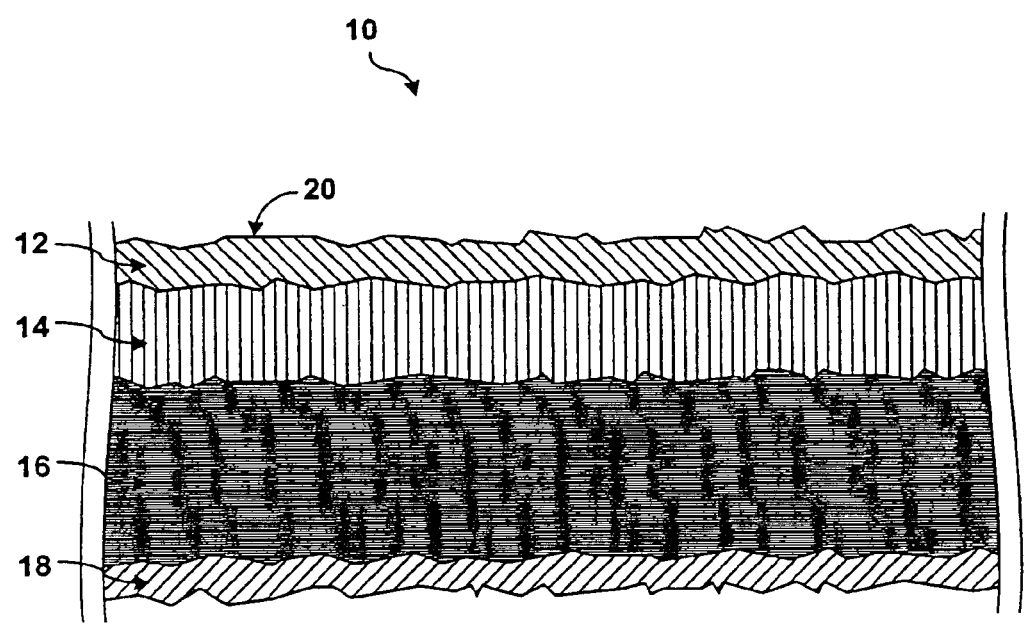
FIG. 1 is a cross-sectional diagram of a magnetic recording medium.

FIG. 1 shows a cross-section of a magnetic recording medium 10. Magnetic recording medium 10 comprises a recording layer 12, a highly permeable magnetic underlayer 14 proximal to magnetic recording layer 12, and a substrate 16. Magnetic recording medium 10 optionally includes a backside coating 18.

Medium 10 may be constructed using techniques for construction of a conventional magnetic recording medium, but further include highly permeable magnetic underlayer 14. Substrate 16 is typically formed of plastic such as polyethylene terephthalate or polyethlyene naphthatlate.

Substrate 16 provides a foundation for recording layer 12 and permeable magnetic underlayer 14. Permeable magnetic underlayer 14 may comprise, for example, very fine isotropic gamma ferric oxide particles. Permeable magnetic underlayer 14 may be applied as a coating to substrate 12, and may include a binder to promote attachment to substrate 16.

Permeable magnetic underlayer 14 may have a relative permeability greater than 20, and a coercivity in a range of 0.00001 Oe to 100 Oe. In addition, permeable magnetic underlayer 14 should have a saturation magnetization less than or equal to that of recording layer 12. In some cases, the moment of magnetic underlayer 14 may be chosen so as not exceed the moment of recording layer 12, or not to exceed the moment of recording layer 12 by a predetermined percentage.

Recording layer 12 may be applied as a coating over permeable magnetic underlayer 14. Recording layer 12 comprises ferromagnetic material such as gamma ferric oxide, and may also include a binder and a dry lubricant. Recording layer 12 may be coated over permeable magnetic underlayer 14. The thickness of recording layer 12 may vary, but ordinarily the thickness of recording layer 12 is chosen to support a desired recording wavelength. The overall thickness of the substrate 16, permeable magnetic underlayer 14 and recording layer 12 should ordinarily be less than or equal to five microns ($\mu$m).

Although media surface 20 is smooth, media surface 20 includes irregularities at the microscopic level. In addition, the interface between recording layer 12 and permeable magnetic underlayer 14 includes microscopic irregularities.

Figure 2:
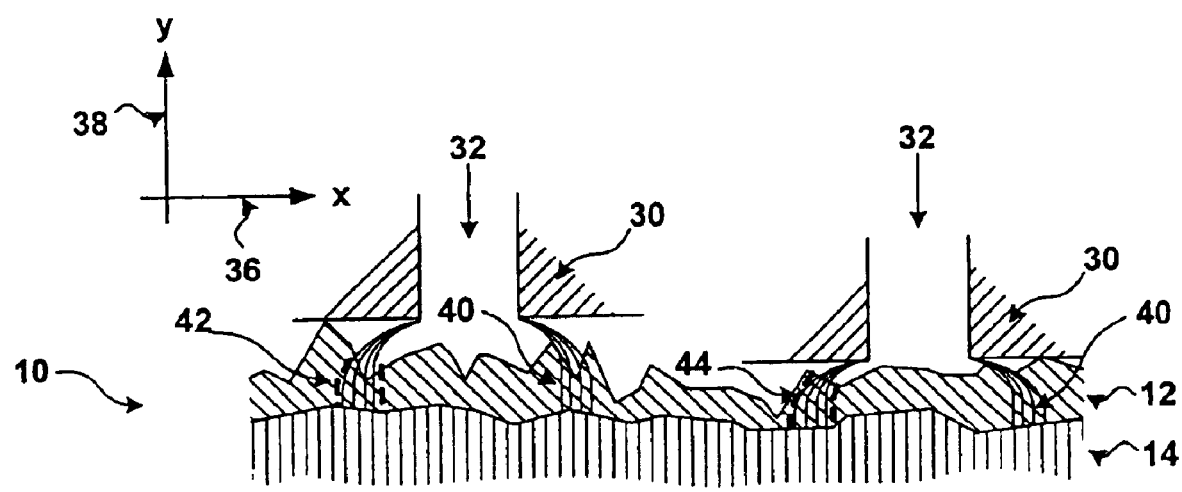
FIG. 2 is a cross-sectional diagram of a magnetic recording medium, with a recording head and a recording field.

FIG. 2 shows recording head 30 traveling over media surface 20 in direction x, indicated by reference numeral 36. As head 30 encounters the irregularities on media surface 20, head 30 moves positively or negatively in direction y relative to medium 10, i.e., the distance between head 20 and medium 10 increases or decreases. In other words, surface roughness of medium 10 causes recording gap 32 to be closer or farther from medium 10. FIG. 2 shows head 30 at two different distances from medium 10.

Head 30 is energized, and recording field 40 emanates from gap 32. Recording field 40 in FIG. 2 represents the portion of the generated magnetic field that is strong enough to magnetize medium 10, not necessarily the entire field generated by head 30. Recording field 40 permeates recording layer 12, recording a magnetic transition in recording layer 12.

Notably, recording field 40 does not have an arcuate or substantially circular profile. Instead, recording field 40 is shunted into permeable magnetic underlayer 14. As a result, the recorded transitions have profiles 42, 44 with increased perpendicular components, as compared with transitions recorded by a conventional arcuate recording field. In other words, profiles 42, 44 are substantially vertical with respect to the surface of medium 10, with a significant component in direction y, indicated by reference numeral 38, and a small component in direction x. Notably, recorded transition profile 42, recorded when gap 32 of recording head 30 is further from medium 10, has substantially the same shape as recorded transition profile 44, recorded when gap 32 of recording head 30 is closer to medium 10.

Permeable magnetic underlayer 14, when encountering the field from head 30, generates resultant recording field 40. Recording field 40 behaves as though it results from the interaction between real head 30 and an image head (not shown in FIG. 2) of opposite polarity. In other words, field lines from the "north" pole of head 30 are drawn to the "south" pole of the image head, rather than to the "south" pole of head 30. Similarly, field lines from the "south" pole of head 30 are drawn to the "north" pole of the image head. In this way, recording field 40 is shunted into permeable magnetic underlayer 14, thereby generating recorded transition profiles 42 and 44 having a large perpendicular component.

Recording field 40 does not have a circular shape. Profiles 42 and 44 are substantially less curved than a conventional arcuate recording field. Furthermore, profiles 42 and 44 have a substantially constant width through recording layer 12. A conventional recording field, by contrast, broadens as it penetrates the recording layer.

Consistently shaped profiles that are substantially insensitive to the distance of head 30 from medium 10 are more likely to occur when recording layer 12 is thin and permeable magnetic underlayer 14 is close to the surface of recording medium 10. In particular, this effect is maximized when the distance between head 30 and permeable magnetic underlayer 14 is less than or equal to one-half the distance across gap 32.

In practice, recording fields form consistent vertical profiles when the distance between head 30 and permeable magnetic underlayer 14 is one-half the distance across gap 32 or less. When the distance between head 30 and permeable magnetic underlayer 14 is less than one-half the distance across gap 32, one pole of head 30 will be closer to a complementary image pole than to the real complementary pole on the opposite side of gap 32. As a result, recording field 40 will tend to be drawn perpendicularly toward the image.

A conventional magnetic medium lacks a permeable magnetic underlayer. As a result, the recording field that emanates from the gap in the recording head has arcuate profile through the recording layer. With an arcuate profile, the recording field has a larger horizontal component than profiles 42 and 44 shown in FIG. 2, and a smaller perpendicular component than profiles 42 and 44. In addition, the gradient of the recording field that penetrates the recording layer of a conventional medium broadens as the field penetrates the medium.

Recorded transition profiles in a conventional medium is not only shaped differently from profiles 42 and 44, recorded transition profiles in a conventional medium are also shaped differently from each other. As the distance between the recording head and the conventional medium changes, the shape of the transition profiles changes. Transition profiles in a conventional medium are inconsistent from one transition to the next.

One source of inconsistency is "transition width broadening." The gradient of the recording field that penetrates the recording layer of a conventional medium broadens as the field penetrates the medium, and the depth of penetration depends upon the proximity of the recording head to the surface of the medium.

Another source of inconsistency in a conventional medium is "position jitter." Position jitter is caused by the changes in shape of the recorded transitions due to the changes in penetration of the recording field into the recording layer. As a result, the positions of the transitions are inconsistent, and the horizontal and perpendicular components of the transition profile change from transition to transition. Like transition width broadening, position jitter depends upon the distance of the recording head from the conventional medium.

Transition width broadening and position jitter contribute to what shall be called "tone noise." Tone noise can affect the ability of a read head to recover recorded data. Tone noise affects the entire spectrum, but is more pronounced at lower recording frequencies.

The invention reduces tone noise, and enhances the signal-to-noise ratio, by including permeable magnetic underlayer 14 below recording layer 12. As shown in FIG. 2, the presence of permeable magnetic underlayer 14 causes recorded transition profiles 42 and 44 to have a substantial perpendicular component. Furthermore, the presence of permeable magnetic underlayer 14 causes recorded transition profiles 42 and 44 to be more consistent in shape and position, and less sensitive to the distance of gap 32 of recording head 30 from medium 10. Because recorded transition profiles 42 and 44 are substantially perpendicular and consistently shaped, transition width broadening and position jitter are reduced significantly. In this way, permeable magnetic underlayer 14 reduces tone noise due to variations in spacing between recording head 30 and medium 10.

Figure 3:
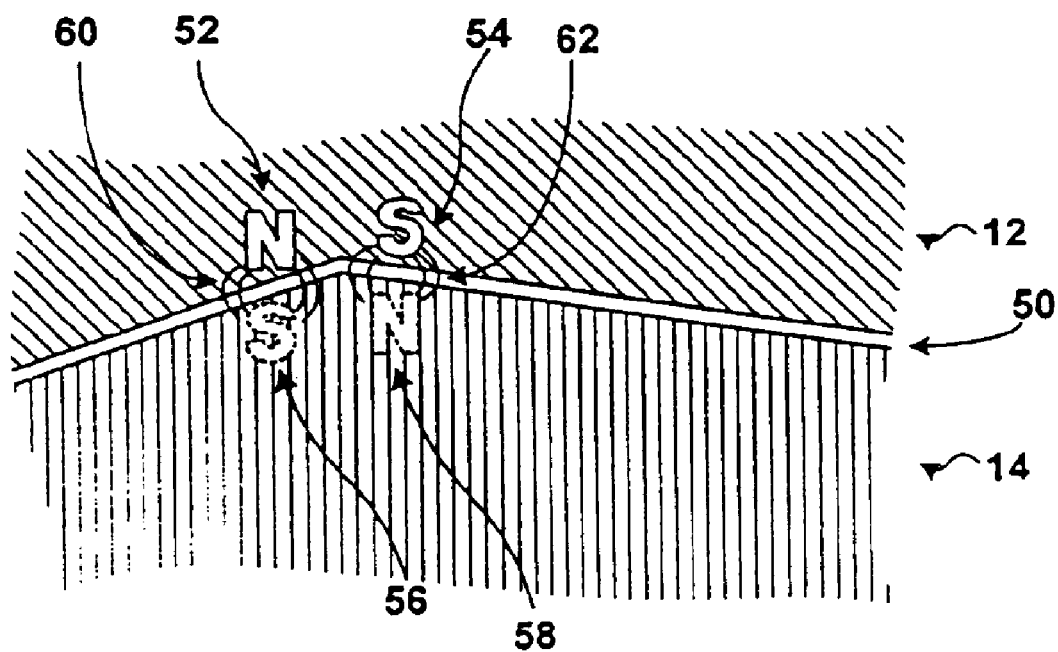
FIG. 3 is a cross-sectional diagram of a magnetic recording medium at an interface between a recording layer and a permeable magnetic underlayer.

FIG. 3 illustrates another aspect of medium noise reduction with permeable magnetic underlayer 14. Interface 50 between recording layer 12 and permeable magnetic underlayer 14 is rough at the microscopic level. During recording, a magnetic dipole 52, 54 forms around the rough edges of interface 50. In a conventional magnetic medium, magnetic field lines between poles 52 and 54 contribute to medium noise. This component of medium noise may also be called "packing noise."

In a medium with permeable magnetic underlayer 14, however, stray dipole fields are significantly reduced. Permeable magnetic underlayer 14 forms an image 56, 58 of dipole 52, 54, with opposite polarity. Real poles 52 and 54 are physically closer to image poles 56 and 58 than they are to each other. Consequently, magnetic flux 60, 62 between real poles 52 and 54 and image poles 56 and 58 predominates over flux between real poles 52 and 54. Moreover, because of image poles 56 and 58, the magnetic fields between real and image poles are shunted into permeable magnetic underlayer 14, and as a result, the fields are less likely to be sensed by a read head. In this way, permeable magnetic underlayer 14 reduces the noise caused by the irregularities in the interface 50 between recording layer 12 and permeable magnetic underlayer 14.

In summary, permeable magnetic underlayer 14 reduces medium noise in three respects. Permeable magnetic underlayer 14 reduces transition width broadening and position jitter by promoting recording fields with a substantially consistent shape and a substantially consistent width, even when the distance between recording head 30 and medium 10 changes. In addition, permeable magnetic underlayer 14 causes recorded transitions to have a substantially perpendicular profile. Furthermore, permeable magnetic underlayer 14 also makes the magnetic fields of stray dipoles smaller. Each of these effects contributes to the reduction of noise. As a result, medium 10 with permeable magnetic underlayer 14 has a signal-to-noise ratio that is improved over a conventional medium.

A number of implementations and embodiments of the invention have been described. The invention may be used in a variety of contexts, such as in conjunction with a computer system, such as a personal computer having a high-density tape drive, or other device that might utilize such a device. These and other embodiments are within the scope of the following claims.

What is claimed:

1. An apparatus comprising:
   a magnetic recording head having a gap; and
   a magnetic recording medium having a recording layer and a permeable magnetic underlayer proximate to the recording layer, the recording layer having a thickness less than or equal to one-half of a width of the gap,
   wherein the magnetic recording medium is configured to record a transition oriented perpendicular to a surface of the magnetic recording medium.

2. The apparatus of claim 1, wherein the permeable magnetic underlayer has a permeability of greater than 20.

3. The apparatus of claim 1, wherein the permeable magnetic underlayer has a coercivity in a range of 0.00001 Oe to 100 Oe.

4. The apparatus of claim 1, wherein a saturation magnetization of the permeable magnetic underlayer is less than or equal to a saturation magnetization of the recording layer.

5. The apparatus of claim 1, further comprising a substrate proximate to the permeable magnetic underlayer.

6. A magnetic recording medium comprising:
   a recording layer configured to record a transition oriented perpendicular to a surface of the magnetic recording medium;
   a substrate; and
   a permeable magnetic underlayer between the recording layer and the substrate,
   wherein the permeable magnetic underlayer alters a recording field passing through the recording layer; and
   wherein the permeable magnetic underlayer alters the recording field by generating an image recording field.

7. The medium of claim 6, wherein the permeable magnetic underlayer alters the recording field by increasing a perpendicular component of the recording field.

8. The medium of claim 6, wherein the permeable magnetic underlayer has a permeability of greater than 20.

9. The medium of claim 6, wherein the permeable magnetic underlayer has a coercivity in a range of 0.00001 Oe to 100 Oe.

10. The medium of claim 6, wherein a saturation magnetization of the permeable magnetic underlayer is less than or equal to a saturation magnetization of the recording layer.

* * * * *